United States Patent
Kagan

[11] 3,961,645
[45] June 8, 1976

[54] FLUID-CONVEYING PIPE CONNECTOR

[76] Inventor: Aristide Jean Michel Kagan, 14 bis, Avenue Pierre Curie, 77330 Ozoir-la-Ferriere, France

[22] Filed: Dec. 19, 1974

[21] Appl. No.: 534,573

[30] Foreign Application Priority Data
Dec. 21, 1973 France ............................. 73.46106

[52] U.S. Cl. ........................ 137/630.15; 251/149.6
[51] Int. Cl.² ......................................... F16L 29/00
[58] Field of Search ................. 137/614.04, 614.05, 137/630.15; 251/149.6, 149.7

[56] References Cited
UNITED STATES PATENTS

| | | | |
|---|---|---|---|
| 3,032,063 | 5/1962 | Wells | 137/630.15 X |
| 3,132,667 | 5/1964 | Baker et al. | 137/614.05 X |
| 3,336,944 | 8/1967 | Anderson et al. | 137/630.15 X |
| 3,498,324 | 3/1970 | Breuning | 137/630.15 X |

*Primary Examiner*—Robert G. Nilson
*Attorney, Agent, or Firm*—Haseltine, Lake & Waters

[57] ABSTRACT

Connector for joining two ducts one of which communicates with a source of fluid under pressure, said connector comprising two coaxially disposed valve, an auxiliary one of reduced surface and a main one of greater surface. During the connection of the ducts, the auxiliary valve is firstly opened allowing the balancing of the pressure forces and the further opening of the main valve.

5 Claims, 6 Drawing Figures

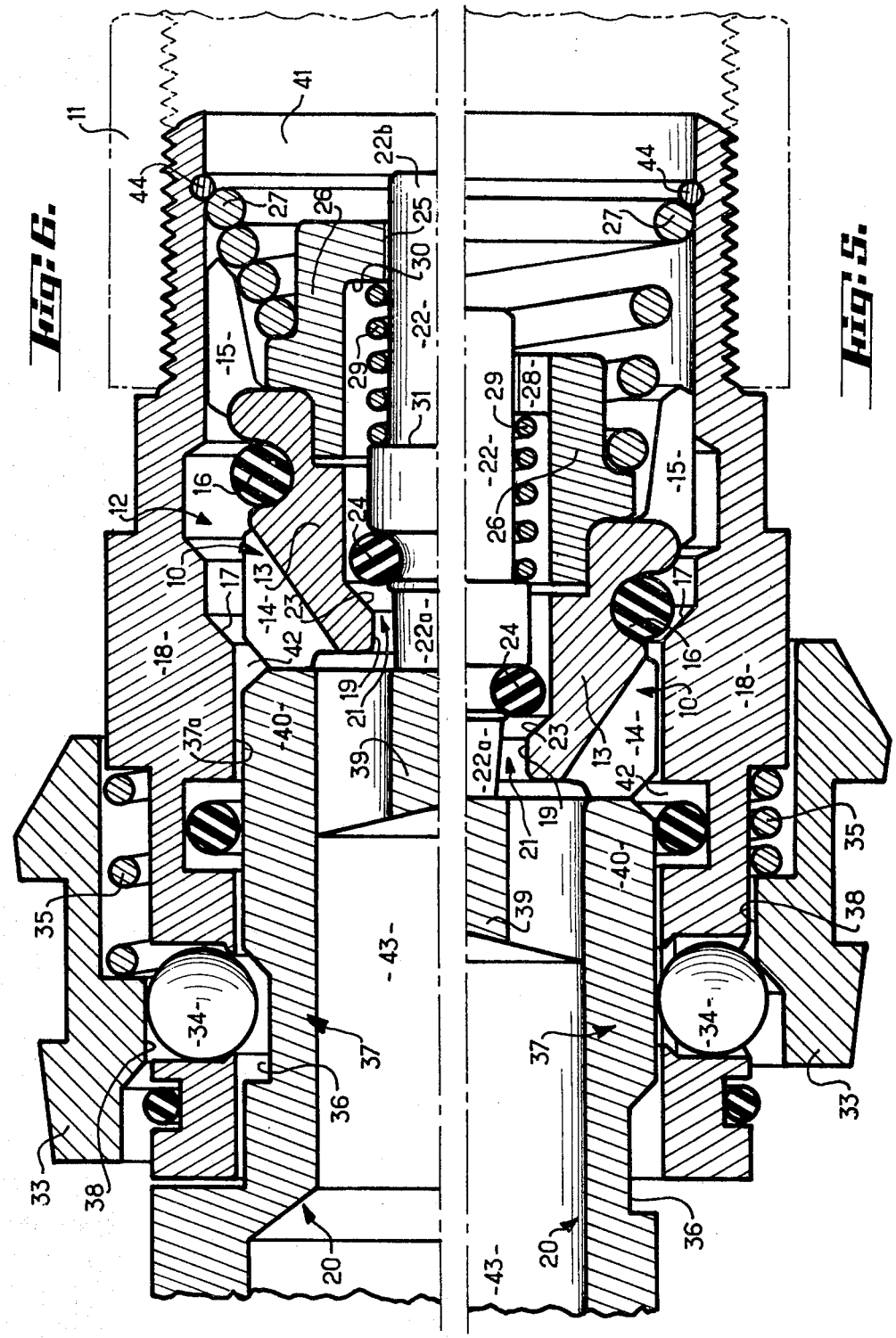

FLUID-CONVEYING PIPE CONNECTOR

The present invention relates essentially to a connector, union or like coupling device or fitting member enabling to carry out a junction of a pair of pipes or ducts one of which communicates with a source for supplying a fluid under pressure, said connector comprising a first part fitting the end of the duct connected to said source and a second part provided at the co-operating end of the second duct.

Such connectors are well known and used for instance for connecting a flexible pipe or like hose to a water tap or cock connected to the town distributing mains or pipe-line system or also for connecting the head of a water nozzle to a pipe connected to a source for supplying water under pressure.

Usually said first part of the connector or like pipe fitting or coupling which is provided on the end of the duct connected to the source of fluid under pressure comprises a valve which automatically closes off said end of the first duct and which is urged when closing against its seat in particular by the action of the fluid feed pressure prevailing in the first duct or pipe when both parts of the connector are not assembled together. Such connectors are very interesting in themselves by being fool proof or avoiding any false actuations. Their handling however exhibits a significant inconvenience in particular each time the pressure of the fluid feed source is relatively high as is usually the case with town water distributing mains. This inconvenience results from the difficulty of connecting both parts of the connector taking into account the very large pressure effort it is necessary to exert against the pressure of fluid admitted into the first duct for pushing back and opening the valve which fits the first end of the connector. It is thus necessary to often exert a force of several tens kilograms for overcoming the fluid pressure and cause the valve member to be disengaged or lifted from or brought off its seat. The object of the invention is to cope with this difficulty.

For this purpose according to the invention the connector being of the aforesaid kind comprising two parts, the first part including a main valve which closes off said end of the first duct and which is urged when closing against its seat in particular by the action of the fluid feed pressure prevailing in the first duct this first part moreover comprises a second auxiliary valve which also closes off said end of the first duct and which is also urged upon closing against its seat in particular by the action of the fluid feed pressure prevailing in the first duct, the seat of said auxiliary valve having a reduced section with respect to that of the main valve and said second part of the connector co-operating with control members for the opening of said valves which are so arranged that when both connector parts are drawn near or moved towards each other for connecting them said second part would at first open said auxiliary valve so as to allow a small fluid flow rate to pass from the first duct to the second duct when beginning to couple the connector and then would open said main valve. In this way the applied effort required to open the first valve is reduced as the fluid pressure force-applying section in the first duct is reduced. However the opening of this auxiliary valve which allows a relatively small flow rate to pass from the first duct to the second duct enables the fluid under pressure which is then flowing through the first duct to pass behind the seat of the main valve thereby balancing to a significant extent the pressure forces which tended to keep the main valve in pushed engagement with its seat. Therefore the exerted force required for opening the main valve is significantly reduced thereby enabling to overcome the difficulties mentioned hereinabove and inherent in the prior art connectors.

The invention will be better understood and further objects, characterizing features, details and advantages thereof will appear more clearly as the following explanatory description proceeds with reference to the accompanying diagrammatic drawings given by way of a non-limitative example only illustrating one presently preferred form of embodiment for using and applying a connector device according to the invention. In these drawings:

FIGS. 5 and 6 are two half-views in longitudinal sections with parts broken away showing the use of a connector according to that depicted in the previous Figures and enabling to carry out the junction of both pipes.

Figure 1:
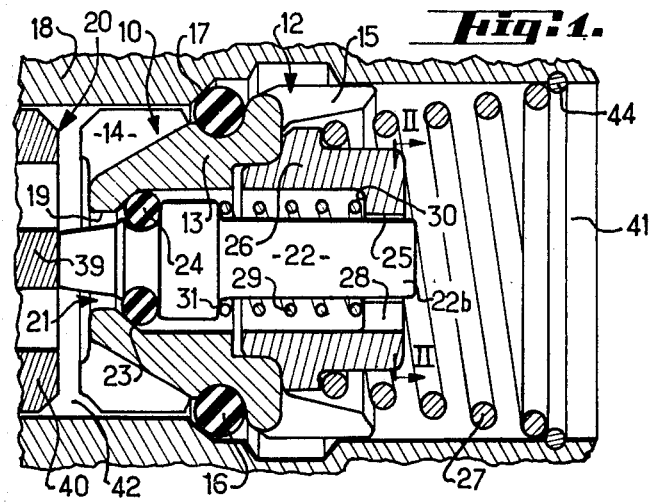
FIG. 1 is a view in longitudinal section with parts broken away showing the various parts of a connector according to the invention with both parts of the connector ready to co-operate for providing the junction of both ducts or pipes.

According to the form of embodiment illustrated in the drawings a connector according to the invention comprises a first part or member 10 fitting the end of a duct or pipe 11 which is connected to a supply source (not shown) for feeding a fluid under pressure such as water. This first part comprises a main valve 12 which consists essentially of a valve body 13 in which are formed holes or slots 14, 15 for the passage of fluid and on which is mounted a fluid-tight seal or packing 16 which co-operates with a seat 17 provided by the inner frusto-conical or tapering restriction or narrowed portion of a sleeve 18 in which the valve member 12 is slidable and on which the duct 11 is secured.

The connector also comprises a second part or element 20 which is mounted at the co-operating end of the second pipe or duct (not shown) which receives the fluid from the duct 11 when the connection of both ducts has been effected.

According to the invention the first part 10 of the connector comprises a second valve or auxiliary valve 21 which includes a piston rod 22 one end 22a of which projects towards the second part 20 of the connector through a central aperture 19 formed in the body 13 of the main valve 12. In the body 13 adjacent to the passageway 19 is provided a frusto-conical or tapering restriction or like narrowed portion forming a seat 23 for the fluid-tight seal or packing 24 of the auxiliary valve 21, which seal is mounted on the rod 22. The other end 22b of the piston rod 22 is guided in an aperture 25 formed in a cap or cover 26 mounted in bearing engagement with the body 13 under the action of the force of a return spring 27 biasing or drawing back the valve 13 while bearing against a keeper or like retaining ring 44.

Figure 2:
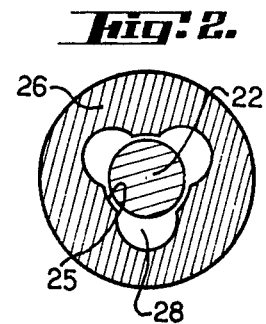
FIG. 2 is a view in cross-section taken upon the plane II—II in FIG. 1.

Passageways 28 (FIG. 2) are provided in the cap for the ingress of the fluid towards the auxiliary member 21. A biasing spring 29 urging the auxiliary valve 21 towards closing position is also mounted about the rod 22 between the bottom or end wall 30 of the cap 26 and a supporting collar 31 is provided on the rod 22.

Referring to FIGS. 5 and 6 there has been shown the application of a connector designed according to the invention to the connection of two ducts (only the inlet duct 11 of which has been shown) and this by means of a connecting ring 33 with balls 34 providing in a known manner the coupling between the sleeve 18 and the sleeve 20 forming the second part of the connector. The locking mechanism with the ring 33 known per se comprises a locking spring 35.

In the position of inserting or disassembling both parts of the connector as shown in FIG. 5 the spring 35 is compressed the balls 34 have moved out of the circular groove 36 formed in the outer surface of the wall 37 of the sleeve 20.

In the locking position shown in FIG. 6, the spring 35 is released and the balls 34 are locked by the projection 38 of the ring 33 into the circular groove 36 of the sleeve 20 thereby preventing both connector parts from being disassembled or disconnected as long as the ring 33 has not been pushed back against the action of the spring 35 in order to allow the balls 34 to move out of the groove 36 so as to be able to ride on the cylindrical surface portion 37a of the sleeve 20.

The operation of the illustrated device will now be described.

In the position of the device shown in FIG. 1, which position corresponds to that illustrated in FIG. 5, the sleeve 20 forming said second connector part is drawn near or moved towards the first part 10. More specifically the end of the sleeve 20 comprises a central portion 39 which is caused to be opposite to the end 22a of the piston rod 22 and an annular portion 40 which is caused to be opposite to the body 13 of the main valve 12. These various elements are so arranged that when both connector parts are drawn near or moved towards each other for coupling them together, the central portion 39 is caused to bear against the piston rod 22 of the auxiliary valve 21 before the annular portion 40 engages the body 13 of the main valve 12 (FIG. 1).

Figure 3:
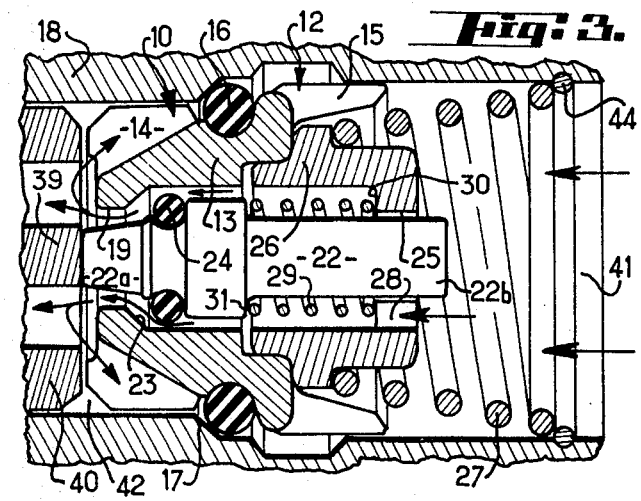
FIGS. 3 and 4 are sectional views similar to those in FIG. 1 and illustrating two successive positions, respectively, of the connector.

Under these circumstances when the sleeve 20 is inserted into the sleeve 18 by pushing both parts of the connector against each other the central portion 39 of the sleeve 20 at first opens, as shown in FIG. 3, the auxiliary valve 21 by disengaging the seal 24 from the seat 23. This operating step may be carried out without exerting any large effort owing to the fact that the fluid pressure prevailing within the inlet chamber 41 exerts onto the auxiliary valve 21 a relatively small action only taking into account the relatively small closing section of the valve 21. Under such circumstances the pressure fluid present in the inlet chamber 21 is allowed to circulate as shown in FIG. 3 by the arrows while flowing through the passageway 28, the open auxiliary valve 21 and from there towards the inside space of the sleeve 20 and also into the chamber 42 thereby exerting a back-pressure action onto the rear face of the body 13 of the main valve 12.

Figure 4:
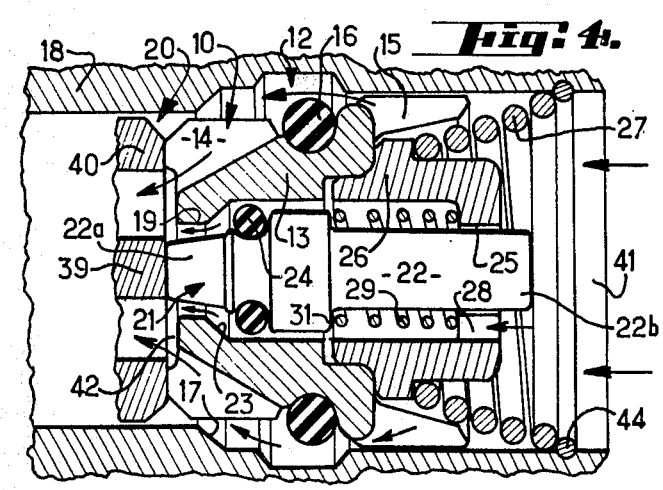

Under these circumstances when the action of fitting the sleeve 20 into the sleeve 18 is continued the main valve 12 is pushed back as shown in FIG. 4 owing to the fact that the annular portion 40 of the sleeve 20 has been caused to bear against the body 13 of the valve 12 thereby opening the latter. This opening is effected without exerting any substantial force owing to the back-pressure of the fluid built behind the valve 12 due to the previous ingress of pressure fluid into the chamber 42. The fluid may then circulate as shown in FIG. 4 by the arrows while essentially flowing through the passageways 15, 14 provided in the body 13 of the main valve, the fluid-tight seal 16 of which has been disengaged from its seat 17.

In FIG. 6 are seen in the practical embodiment illustrated with a locking ring 33 the corresponding relative positions of the various parts of the connector in this opening position of the main valve 12.

It should be understood that the invention is not at all limited to the form of embodiment shown and described which has been given by way of example only, the invention comprising all the technical equivalents of the means described as well as their combinations if the same are carried out according to its gist and used within the scope of the appended claims.

What is claimed is:

1. A connector forming a junction between the free ends of two ducts one of which communicates with a source supplying a fluid under pressure, said connector comprising a first part fitting the free end of the duct connected to said source and a second part mounted on the free end of the second duct, said first part comprising a main valve having a seat closing off said free end of the first duct and urged upon closing against its seat by the action of the fluid feed pressure prevailing in the first duct, said first part further comprising a second auxiliary valve having a seat also closing off said end of the first duct and which is also urged upon closing against its seat by the action of the fluid feed pressure prevailing in said first duct, said seat of said auxiliary valve having a reduced section as compared with that of said main valve, said second connector part co-operating with control members for the opening of said valves which are so arranged that when both connector parts are drawn near each other for connecting the same together said second part will at first open said auxiliary valve while allowing a small fluid flow rate to pass from said first duct to the second duct at the beginning of the coupling step of said connector and then will open said main valve, said main and auxiliary valves including biasing springs returning said valves to their closing position, said auxiliary valve comprising a piston rod forming the head of the valve, said piston rod being coaxial with said main valve, said seat of said auxiliary valve being formed within the head of said main valve, said piston rod passing through said seat, said second connector part comprising a central portion and an annular portion, said central portion being caused to push back said piston rod of said auxiliary valve thereby actuating the same for the opening thereof, said annular portion portion being caused to push back said head of said main valve thereby actuating the same for opening thereof, said central portion and said annular portion being so disposed that said auxiliary valve is actuated for opening before said main valve, a fluid-tight seal mounted on said head of said main valve to co-operate with said seat of said main valve, said head having passages for the flow of said fluid therethrough when said head is not applied against its seat, said head being provided with a central aperture forming said seat for said auxiliary valve, said piston rod of said auxiliary valve comprising first and second ends, said first end projecting towards said second connector part through said central aperture of said main valve and forming said head of said auxiliary valve, a fluidtight seal mounted on said first end for co-operating with said seat formed in said head of said main valve, a cap mounted so as to bear against said head of said main valve under the action of the biasing spring returning said main valve to the closing position, said cap having a passageway through which said second end of said piston rod is guided, a sleeve locating said first connector part and connectable to said free end of said first duct, an abutment on said sleeve, said biasing spring of the main valve being mounted between said cap and said abutment, said cap having further passageways for allowing the ingress of said fluid towards said auxiliary valve.

2. A connector according to claim 1, wherein said piston rod including a supporting collar, said biasing spring for returning said auxiliary valve to the closing position being mounted around said piston rod between said supporting collar and the bottom wall of said cap.

3. A connector according to claim 1 wherein said sleeve defines a chamber for allowing the fluid to flow out of said first duct, and said main valve slides within said sleeve.

4. A connector according to claim 3, wherein the seat of said main valve is formed by an inner tapering narrowed portion of said sleeve.

5. A connector according to claim 3, wherein said second connector part consists of a sleeve which forms an inlet chamber for said fluid into said second duct.

* * * * *